(12) United States Patent
Mai

(10) Patent No.: US 11,519,590 B2
(45) Date of Patent: Dec. 6, 2022

(54) LAMP

(71) Applicant: Guangzhou Zhifei Lighting Co., Ltd, Guangdong (CN)

(72) Inventor: Zhong Mai, Guangzhou (CN)

(*) Notice: Subject to any disclaimer, the term of this patent is extended or adjusted under 35 U.S.C. 154(b) by 0 days.

(21) Appl. No.: 17/465,372

(22) Filed: Sep. 2, 2021

(65) Prior Publication Data
US 2022/0113011 A1    Apr. 14, 2022

(30) Foreign Application Priority Data

Oct. 13, 2020 (CN) .......................... 202011093545.3

(51) Int. Cl.
| | |
|---|---|
| F21V 21/30 | (2006.01) |
| F16M 11/14 | (2006.01) |
| F21V 21/084 | (2006.01) |
| F21V 21/116 | (2006.01) |

(52) U.S. Cl.
CPC .............. *F21V 21/30* (2013.01); *F16M 11/14* (2013.01); *F21V 21/084* (2013.01); *F16M 2200/022* (2013.01); *F21V 21/116* (2013.01)

(58) Field of Classification Search
CPC ...... F21V 21/30; F21V 21/084; F21V 21/116; F21V 21/12; F16M 11/14; F16M 2200/022
USPC ........................................................ 362/362
See application file for complete search history.

(56) References Cited

U.S. PATENT DOCUMENTS

| | | | | |
|---|---|---|---|---|
| 8,393,749 | B1* | 3/2013 | Daicos .................... | A47G 1/04 |
| | | | | 359/865 |
| 8,967,564 | B2* | 3/2015 | Colarusso .............. | F16M 13/02 |
| | | | | 248/181.2 |
| 2012/0294004 | A1* | 11/2012 | Stathis .................... | F21S 6/003 |
| | | | | 403/135 |
| 2014/0321904 | A1* | 10/2014 | Bao ......................... | F21V 21/06 |
| | | | | 403/132 |
| 2018/0340646 | A1* | 11/2018 | Mehdi .................... | G03B 17/55 |

* cited by examiner

*Primary Examiner* — Laura K Tso
(74) *Attorney, Agent, or Firm* — Nora M. Tocups

(57) ABSTRACT

Disclosed is a lamp, including a base, a height adjustable controller, a steering gear, a light source, and a control assembly electrically connected to the light source. The steering gear includes a seat body, a positioning ring, a spring, a tray, a steering ball, and a steering tube connected to the steering ball and the light source, the seat body has a first through hole and a first opening communicated with the first through hole, the positioning ring and the tray are mounted in the first through hole, the spring is clamped between the positioning ring and the tray, the tray is clamped between the spring and the steering ball, a part of the steering ball is located in the first through hole, and a remaining part of the steering ball is protruded out the first through hole from the first opening and connected with the steering tube.

11 Claims, 12 Drawing Sheets

LAMP

TECHNICAL FIELD

The present disclosure relates to the technical field of lamp, in particular to a lamp.

BACKGROUND

Lamps are used as light illumination products in people's daily life. The existing lamps have a small light illumination area, user needs to move the lamp to illuminate an area which is not within the original light illumination area. While it is very difficult and inconvenient to move the lamp with a heavy weight. Some lamps have light illumination area adjustable function, but the light illumination area adjustable function has problems such as small light illumination angle, troublesome, laborious, non-smooth, and hands operation. Meanwhile, controllers (also called control switches) of the existing lamps are mounted outside the lamps. And the heights of the lamps cannot be adjusted, which is troublesome.

SUMMARY

In view of the technical problems existing in the related art, the purpose of the present disclosure is to provide a lamp, its light source is mounted on a ball and socket joint and can be easily rotated in different directions with one hand, and the height of the lamp can also be adjusted.

In order to achieve the above purpose, the present disclosure provides the following technical solutions:

a lamp, including a base, a height adjustable controller mounted on the base, a ball and socket joint mounted on the height adjustable controller, and a light source mounted on the ball and socket joint;

the ball and socket joint includes a seat body, a positioning ring and a spring and a tray all mounted in the seat body, a steering ball, and a steering tube connected to the steering ball; the steering tube is connected to the light source, the seat body is defined with a first through hole and a first opening communicated with the first through hole, the positioning ring is disposed in the first through hole and fixed to an inner wall of the first through hole, the tray is slidably mounted in the first through hole, the spring is clamped between the positioning ring and the tray, the tray is clamped between the spring and the steering ball, a diameter of the steering ball is greater than a width of the first opening, and a part of the steering ball is located in the first through hole, and a remaining part of the steering ball is protruded out the first through hole from the first opening and connected with the steering tube.

Furthermore, the seat body includes a support tube and a lid mounted on the support tube, the first opening is defined at the lid, the positioning ring is mounted in a tube hole of the support tube, and the lid is connected with the support tube.

Furthermore, an inner wall of the first opening includes a first concave spherical surface attached to a spherical surface of the steering ball, and the tray includes a second concave spherical surface attached to the spherical surface of the steering ball.

Furthermore, the light source includes a lamp panel, and a lamp strip, a reflector, a light guide plate and a diffuser all mounted on the lamp panel, the lamp panel is defined with a lamp slot, the lamp strip, the reflector, the light guide plate and the diffuser are sequentially mounted in the lamp slot, a center of the lamp panel is provided with a connecting portion, the lamp panel is connected with the steering tube through the connecting portion.

Furthermore, the height adjustable controller includes a control assembly, the control assembly includes a control tube, a bracket mounted in the control tube, a control circuit board and a socket both mounted on the bracket, and a control panel connected to the control circuit board, one end of the control tube is connected to the base, and another end of the control tube is connected to the ball and socket joint, the bracket is mounted in a tube hole of the control tube, the control tube is defined with a panel hole and a first inserting hole both connected to the tube hole of the control tube, the control circuit board and the socket are both located in the control tube, the control panel is located at the panel hole, an input end of the socket is communicated to the first inserting hole, and an output end of the socket is electrically connected to the control circuit board, the control circuit board is electrically connected to the light source, an inner wall of the control tube is defined with a positioning hole, and the bracket includes a positioning block clamped in the positioning hole.

Furthermore, the height adjustable controller further includes at least one connecting pipes connected in a vertical direction in sequence; and the control tube is arranged in the vertical direction, and connected with the at least one connecting pipe to form a straight pipe.

Furthermore, the bracket is further provided with a bump, an elastic piece, and a positioning rib, the bump, the elastic piece, and the positioning rib are all abutted against the inner wall of the control tube; and the bracket is further defined with a mounting groove and a wiring hole communicated with the mounting groove, the control circuit board is detachably mounted in the mounting groove, the output end of the control circuit board is connected to a cable, and the control circuit board is connected to the light source through the cable.

Furthermore, the control assembly further includes a wire buckle and a pressing buckle, an inner wall of the mounting groove is also provided with a wire clamping block, a first limiting block and a second limiting block spaced from the first limiting block;

the first limiting block is defined with a first buckle tooth groove, the second limiting block is defined with a second buckle tooth groove disposed opposite to the first buckle tooth groove, the wire buckle is provided with a first clamping tooth matched with the first buckle tooth groove and a second clamping tooth matched with the second buckle tooth groove, the wire clamping block is defined with a first wire clamping tooth groove, and the wire buckle is defined with a second wire clamping tooth groove, an inner wall of the first wire clamping tooth groove and an inner wall of the second wire clamping tooth groove enclose to form a wire clamping groove, and the cable is received in the wire clamping groove;

the pressing buckle is defined with a seat groove;

a fixing plate, a first enclosure plate, and a second enclosure plate are received in the mounting groove;

there are a plurality of fixing plates and the plurality of fixing plates enclose to form a buckle groove, the pressing buckle is mounted in the buckle groove, the socket is mounted in a space forming by the seat groove and the buckle groove, an inner wall of the buckle groove is defined with a second inserting hole communicated with the first inserting hole, and an input end of the socket is received in the second inserting hole; and the pressing buckle is also provided with a first clamping block and a second clamping block, the first enclosure plate and the mounting groove are jointly enclosed to form a first clamping cavity, an inner wall of the first clamping cavity is provided with a third clamping tooth, the first clamping block is passed through the first clamping cavity and the third clamping tooth, the second enclosure plate and the mounting groove are jointly enclosed to form a second clamping cavity, and an inner wall of the second clamping cavity is provided with a fourth clamping tooth, the second clamping block is passed through the second clamping cavity and the fourth clamping tooth.

Furthermore, the diameter of the steering ball is greater than or equal to 1.35 times a diameter of the steering tube.

Furthermore, a diameter of an outer wall of the first opening is greater than or equal to 0.885 times the diameter of the steering ball, and smaller than the diameter of the steering ball.

Furthermore, the base includes a chassis and a resist column, a lower end of the resist column is connected to the chassis, and an upper end of the resist column is connected to the height adjustable controller.

Compared with the related art, the beneficial effects of the present disclosure include: the ball and socket joint of the lamp is connected to the light source, and the light source rotates with the center of the steering ball to adjust the light illumination direction and light illumination angle. After adjusting the light illumination angle, the spring indirectly pushes the steering ball against the first opening of the lid to prevent the steering ball from rotating under the action of the gravity of the lamp and to realize the positioning of the light illumination angle. The ball and socket joint drives the steering ball to rotate with a small torque, so that user can easily adjust the light illumination direction of the light source with one hand. When the light source is mounted on the ball and socket joint, the center of gravity of the entire light source is distributed on the base, which can improve the stability of the light source. The number of connecting pipes of the lamp can be set according to the actual situation, so as to adjust the height of the lamp. Consumers can use the lamp as a floor lamp in the living room, or as a desk lamp in the study, which is convenience. The control assembly is mounted in the control tube. The control tube is connected to any one of the connecting pipes in the vertical direction. The control panel of the control assembly is located at the panel hole. The control tube can effectively protect the control assembly. The bracket is provided with a wire buckle, which can prevent the cable in the control tube from being pulled out, and improve the safety of the lamp.

Figure 1:
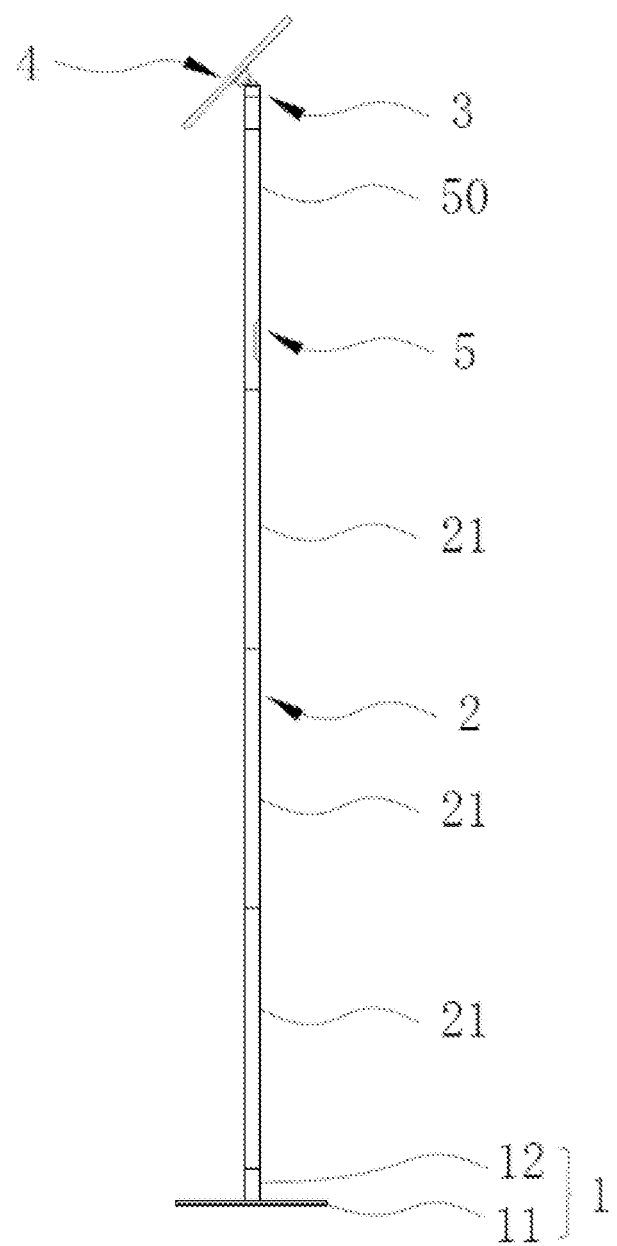
FIG. 1 is a structure diagram of the lamp.

In the figures: 1 base, 2 height adjustable controller, 3 ball and socket joint, 4 light source, 5 control assembly,

11 chassis, 12 resist column, 21 connecting pipe, 31 seat body, 32 positioning ring, 33 spring, 34 tray, 35 steering ball, 36 steering tube, 37 fixing seat, 41 lamp panel, 42 lamp strip, 43 reflector, 44 light guide plate, 45 diffuser, 46 lamp slot, 47 wiring groove, 48 square slot, 49 connecting portion, 50 control tube, 51 bracket, 52 control circuit board, 53 socket, 54 control panel, 55 wire buckle, 56 pressing buckle, 57 wire clamping block, 58 first limiting block, 59 second limiting block;

311 support tube, 312 lid, 313 first through hole, 341 second concave spherical surface, 351 first threaded hole, 361 first external thread, 362 second external thread, 371 second threaded hole, 501 first inserting hole, 502 panel hole, 503 positioning hole, 511 positioning block, 512 bump, 513 elastic piece, 514 mounting groove, 515 wiring hole, 516 positioning rib, 541 cable, 551 first clamping teeth, 552 second clamping tooth, 553 second wire clamping tooth groove, 561 seat groove, 562 first clamping block, 563 second clamping block, 571 first wire clamping tooth groove, 581 first buckle tooth groove, 591 second buckle tooth groove;

3111 third external thread, 3120 first concave spherical surface, 3121 first opening, 3122 third threaded hole, 5141 fixing plate, 5142 first enclosure plate, 5143 second enclosure plate, 5144 buckle groove, 5145 second inserting hole, 5146 first clamping cavity, 5147 third clamping tooth, 5148 second clamping cavity, 5149 fourth clamping tooth.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It should be noted that, relational terms in the present disclosure, such as first and second, are only used to distinguish an entity or an operation from another entity or another operation, and do not necessarily mean or imply any actual relationship or order between these entities or operations. Moreover, the terms "comprising", "including" or other variants aim to cover non-exclusive inclusion, such that the processes, methods, articles, or devices including a series of factors not only include these factors, but also include other factors not listed explicitly, or further include intrinsic for such processes, methods, articles, or devices.

In the present disclosure, unless specified or limited otherwise, the terms "mounted", "connected", "fixed", "communicated", and the like are used broadly, and for example, "fixed" can be fixed connections, detachable connections, or integral connections; may also be mechanical or electrical connections; may also be direct connections or indirect connections via intervening structures, may also be inner connecting of two elements, or interaction relationship between two elements, unless specifically limited otherwise. which can be understood by those skilled in the art according to specific situations, which can be understood by those skilled in the art according to the detail embodiment of the present disclosure.

For the convenience of description, unless otherwise specified, the vertical direction mentioned below is consistent with the vertical direction in FIG. 1.

As shown in FIGS. 1 to 4, an embodiment of the present disclosure provides a lamp, which includes a base 1, a height adjustable controller 2 mounted on the base 1, a ball and socket joint 3 mounted on the height adjustable controller 2, a light source 4 mounted on the ball and socket joint 3. The height adjustable controller 2 can adjust a height of the light source 4, and the ball and socket joint 3 can adjust a light illumination angle of the light source 4.

The ball and socket joint 3 includes a seat body 31, a positioning ring 32 and a spring 33 and a tray 34 all mounted in the seat body 31, a steering ball 35, and a steering tube 36 connected to the steering ball 35. The steering tube 36 is fixedly connected with a fixing seat 37. The seat body 31 is defined with a first through hole 313 and a first opening 3121 communicated with the first through hole 313. The positioning ring 32 is mounted in the first through hole 313 and fixedly connected to an inner wall of the first through hole 313. The tray 34 is slidably mounted in the first through hole 313. The spring 33 is clamped between the positioning ring 32 and the tray 34. The tray 34 is clamped between the spring 33 and the steering ball 35. A diameter of the steering ball 35 is greater than a width of the first opening 3121, and a center of the steering ball 35 is located in the first through hole 313. A part of the steering ball 35 is received in the first through hole 313, a remaining part of the steering ball 35 is protruded out the first through hole 313 through the first opening 3121, then connected to the steering tube 36. The light source 4 is mounted on the fixing seat 37. The steering ball 35 can be rotated by manually rotating the light source 4, so as to adjust a light illumination direction of the light source 4. After the light illumination direction of the light source 4 is adjusted, the spring 33 presses the steering ball 35 upwards to fix the steering ball 35 at the first opening 3121. In this way, the light illumination direction of the light source 4 is changed, and the light source 4 is fixed. The seat body 31 is cylindrical. A diameter of the first through hole 313 is greater than or equal to a diameter of the steering ball 35. An annular bump is provided on the inner wall of the first through hole 313. The annular bump is configured to prevent the positioning ring 32 from sliding downward. The positioning ring 32 is clamped between the annular bump and the spring 33, and the positioning ring 32 provides an upward support force for the spring 33.

In one specific embodiment, the diameter of the steering ball 35 is greater than or equal to 1.35 times a diameter of the steering tube 36, and a diameter of the first opening 3121 is greater than or equal to 0.885 times the diameter of the steering ball 35, and smaller than the diameter of the steering ball 35. At present, it needs a strong force or even two hands to rotate the existing ball and socket joint, and a rotating angle of the existing ball and socket joint is small (no more than 30 degrees). As the spring directly contacts the steering ball, the rotating process of the existing steering ball is not smooth. In view of the above unsmooth rotating process, the tray 34 is added in the present disclosure to increase the rotating damping, and the spring with lower elasticity is selected. The existing ball and socket joint and the spring are in a line contact. By adding the tray 34, a rotating contact area between the steering ball and the spring is increased, so as to rotate the steering ball smoothly. To solve the problem of small rotating angle, the diameter of the steering ball 35 and the diameter of the first opening 3121 are increased. When the diameter of the steering ball 35 is large enough (the diameter of the steering ball 35 is greater than or equal to 1.35 times the diameter of the steering tube) and the diameter of the first opening 3121 is also large enough (the diameter of the steering ball is larger than the diameter of the first opening, and no less than 0.885 times the diameter of the steering ball), the rotating angle far exceeds 30 degrees, and the maximum rotating angle can reach more than 50 degrees.

In one specific embodiment, the inner wall of the first opening 3121 has a first concave spherical surface 3120 attached to a spherical surface of the steering ball 35, and the tray 34 has a second concave spherical surface 341 attached to the spherical surface of the steering ball 35. The second concave spherical surface 341 of the tray 34 is contacted with the spherical surface of the steering ball 35. A lower surface of the tray 34 is defined with an annular groove, a top end of the spring 33 is clamped in the annular groove.

In one specific embodiment, the steering tube 36 has a first end with a first external thread 361 and a second end with a second external thread 362. A first threaded hole 351 is provided on the spherical surface of the steering ball 35, and the steering tube 36 is threadedly connected with the steering ball 35 through the first external thread 361 and the first threaded hole 351. The fixing seat 37 is defined with a second threaded hole 371. The steering tube 36 is threadedly connected with the fixing seat 37 through the second external thread 362 and the second thread hole 371. Both ends of the steering tube 36 are provided with external threads, an upper end of the steering tube 36 is threadedly connected with the fixing seat 37, and a lower end of the steering tube 36 is threadedly connected with the steering ball 35. So that, the steering tube 36 is detachably connected with the fixing seat 37, and the steering tube 36 is detachably connected with the steering ball 35. The steering tube 36 may also be integrally formed with the steering ball 35, and the fixing seat 37 may also be integrally formed with the steering tube 36.

In one specific embodiment, the seat body 31 includes a support tube 311 and a lid 312 mounted on the support tube 311. The first opening 3121 is defined on the lid 312, and the positioning ring 32 is mounted in a tube hole of the support tube 311. The lid 312 is provided with a third threaded hole 3122, an outer circumferential side of the support tube 311 is provided with a third external thread 3111, and the lid 312 is threadedly connected with the support tube 311. The support tube 311 and the lid 312 are both defined with through holes. The through hole of the support tube 311 and the through hole of the lid 312 together form the first through hole 313. The lid 312 is threadedly connected with the support tube 311, and the lid 312 is detachably connected with the support tube 311. When the spring 33, the tray 34, or the positioning ring 32 in the first through hole 313 is damaged, the lid 312 can be unscrewed to take out the damaged component for replacement, for saving maintenance costs. The support tube 311 can also be integrally formed with the lid 312.

Figure 2:
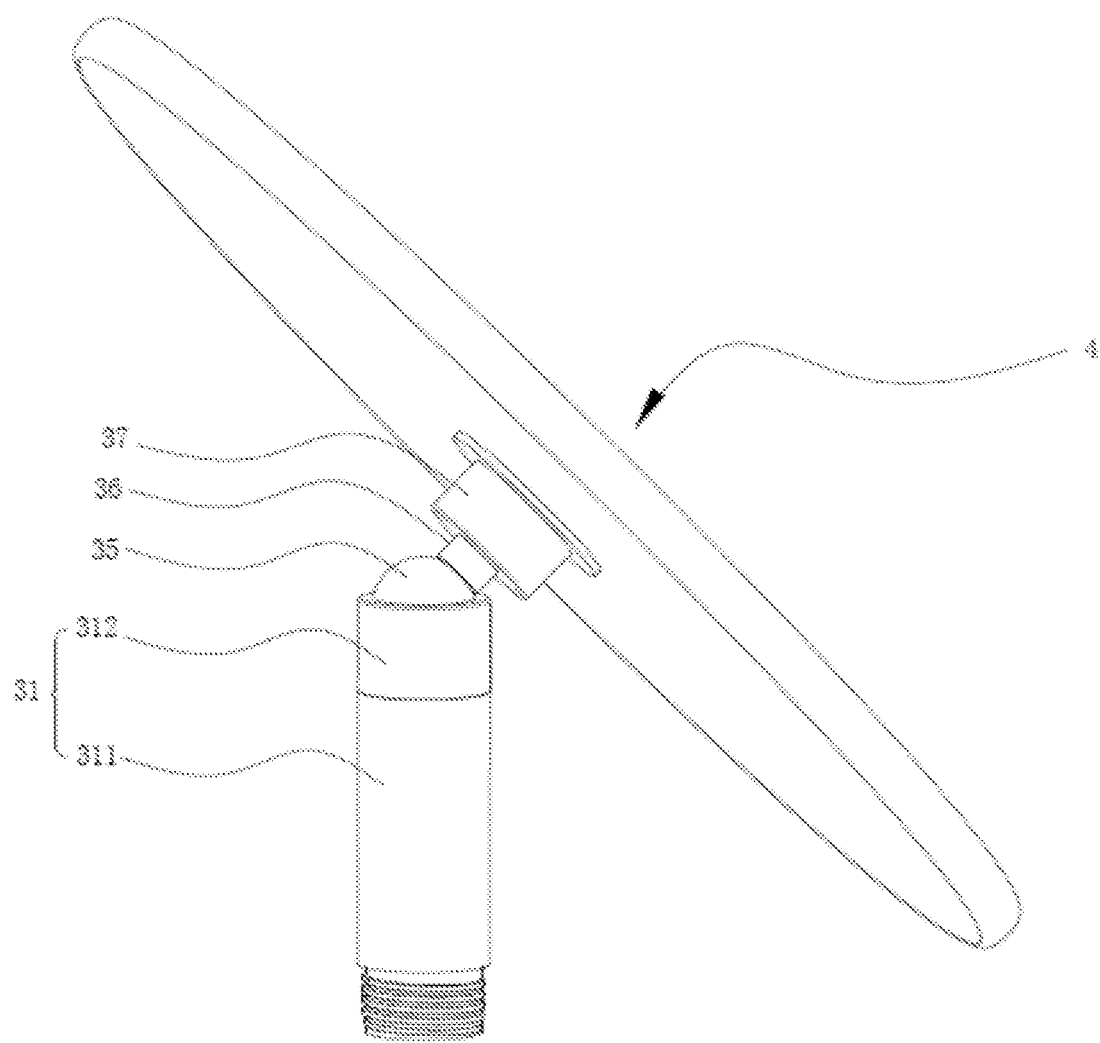
FIG. 2 is a structure diagram of the ball and socket joint and the light source.
Figure 3:
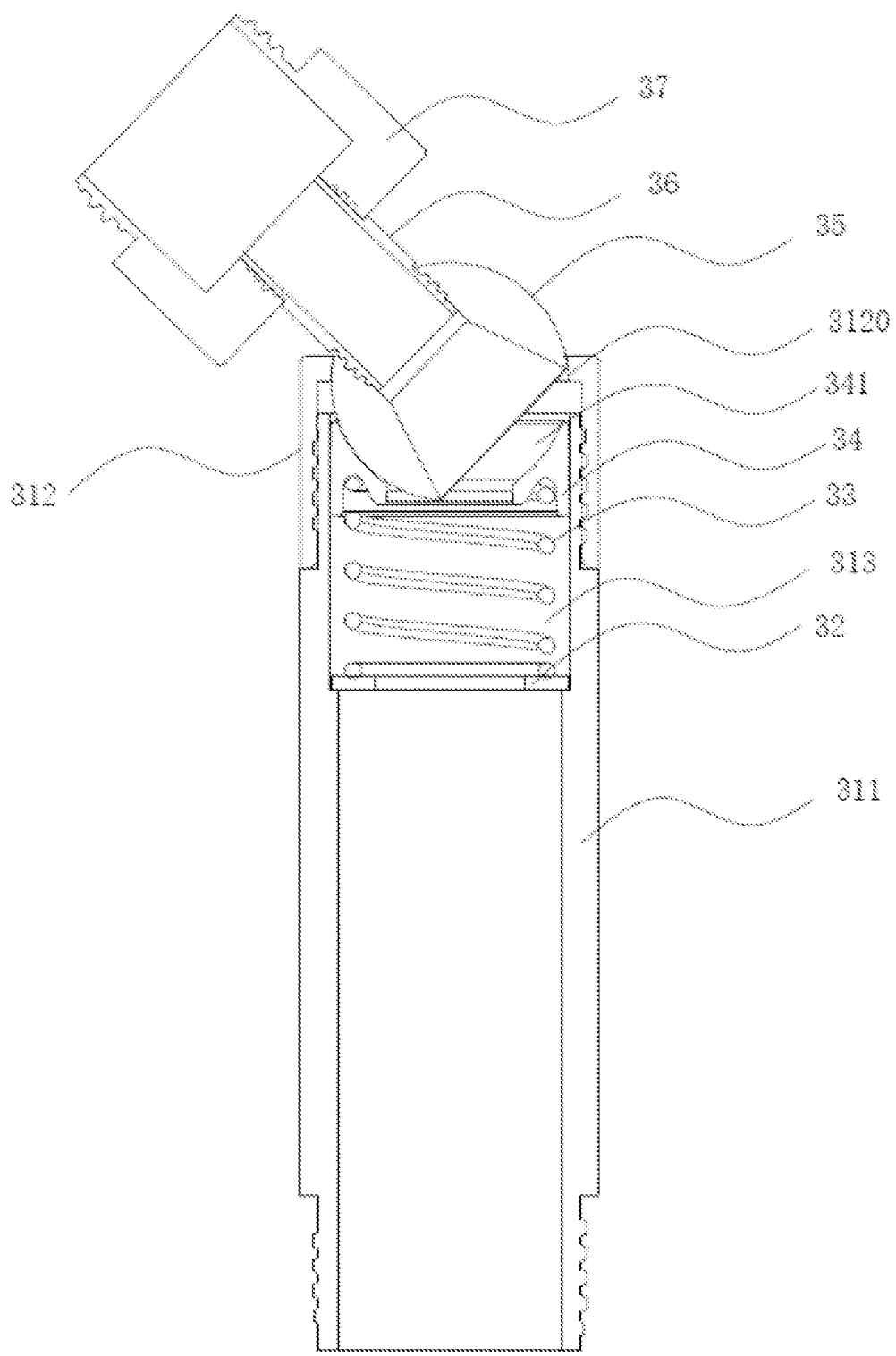
FIG. 3 is a cross-sectional view of the ball and socket joint.
Figure 4:
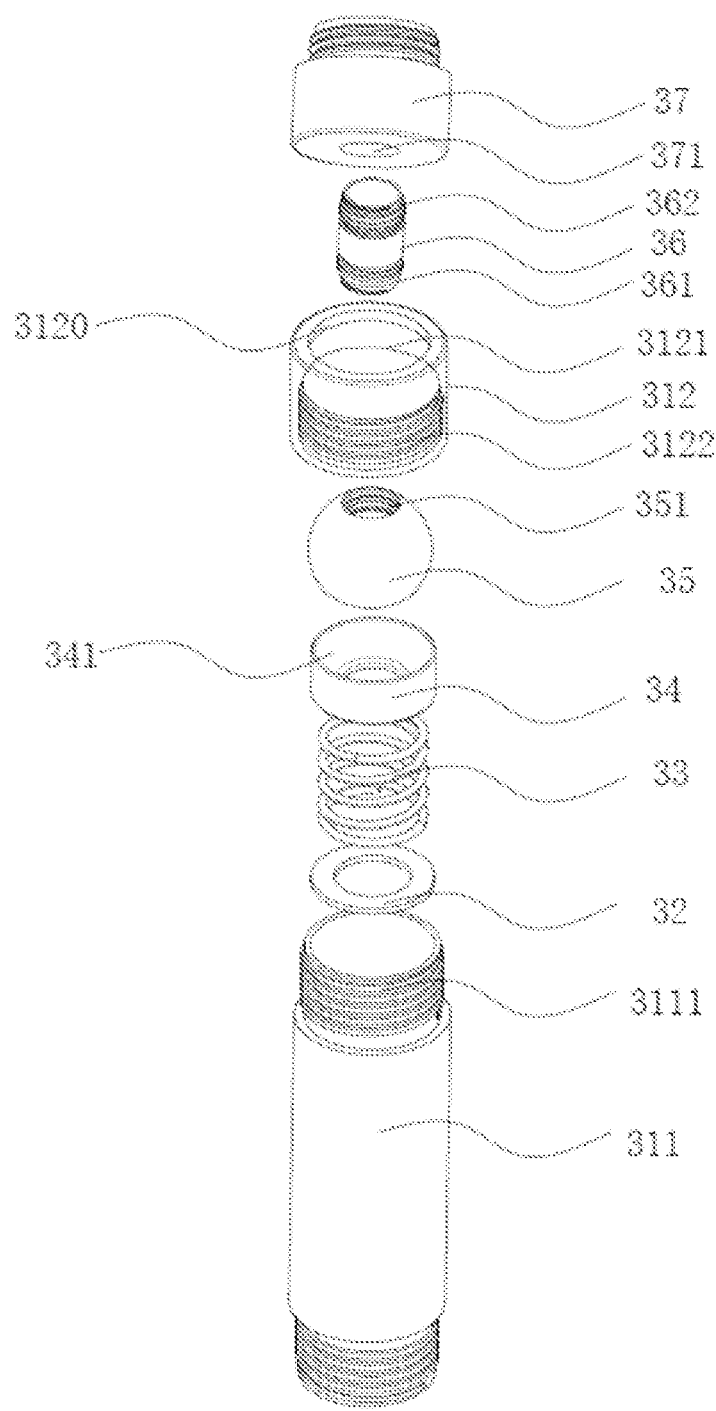
FIG. 4 is an exploded view of the ball and socket joint.
Figure 5:
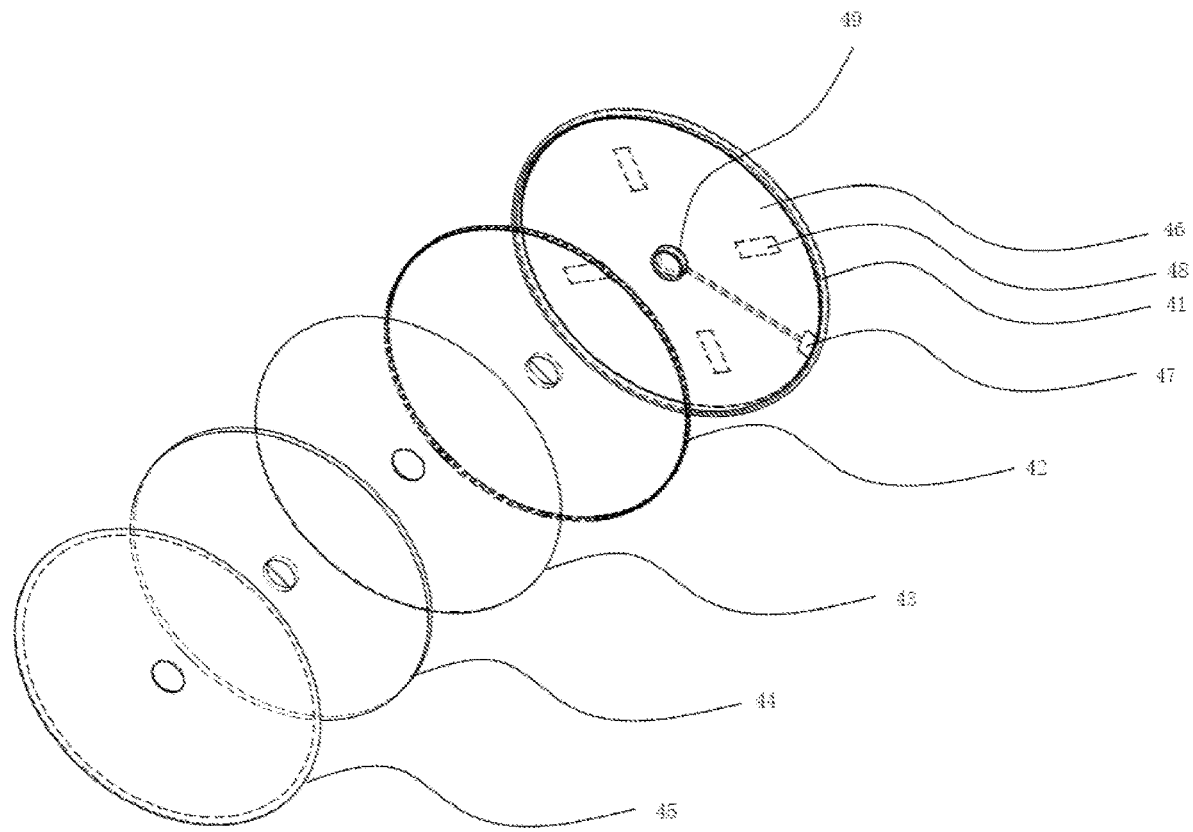
FIG. 5 is a structure diagram of the light source.
Figure 6:
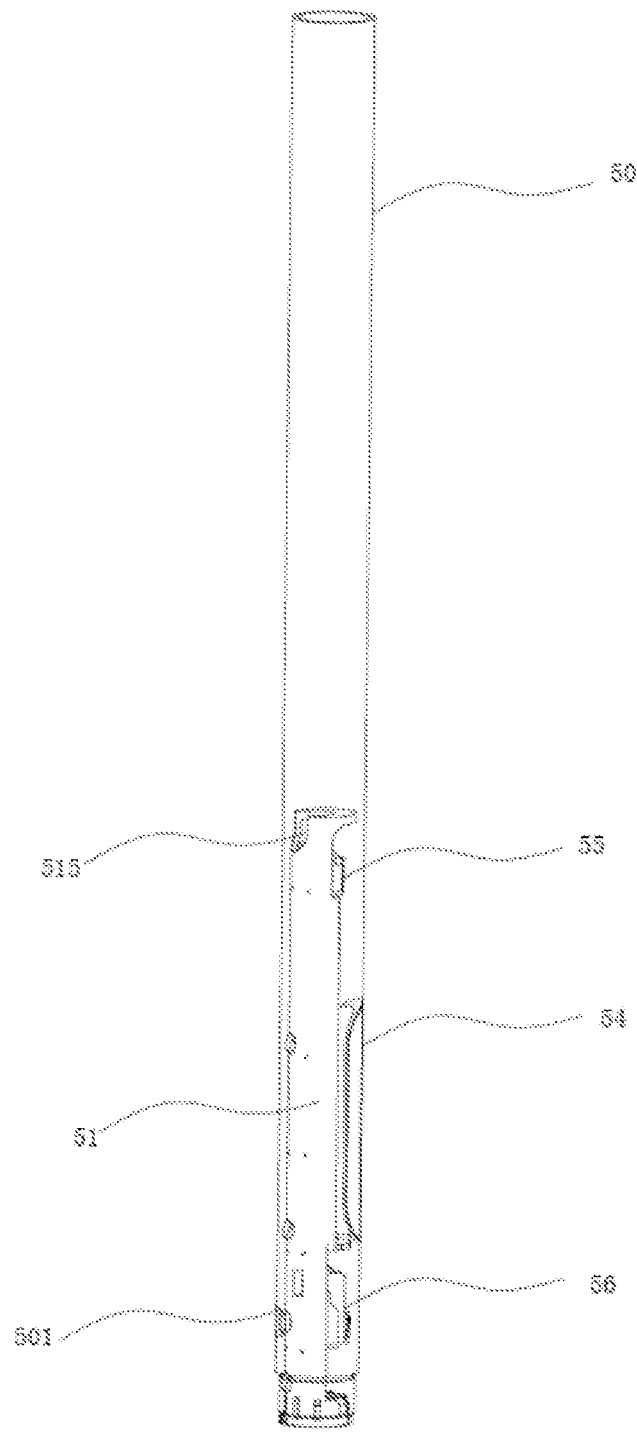
FIG. 6 is a structure diagram of the control assembly and the control tube.
Figure 7:
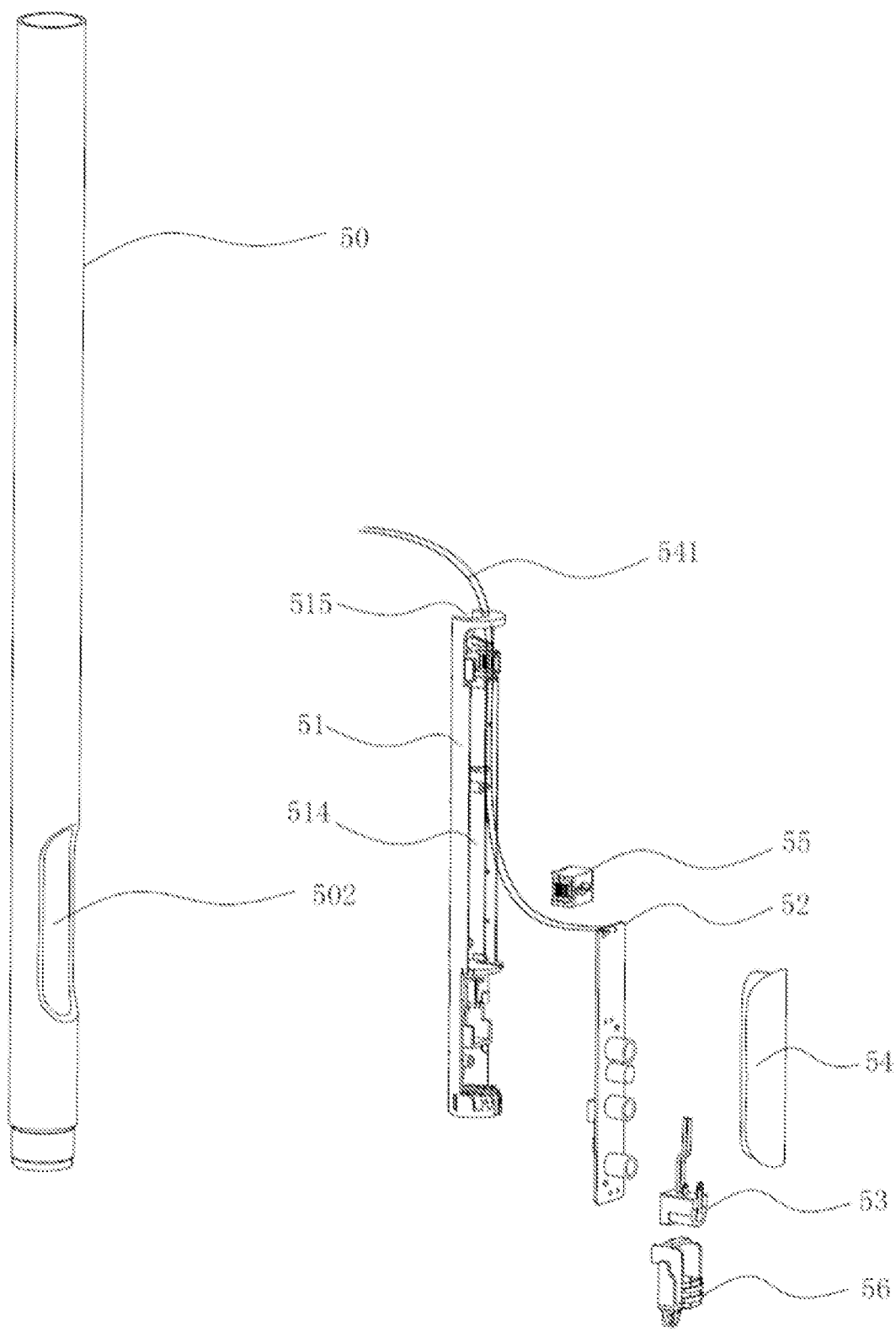
FIG. 7 is an exploded view of the control assembly and the control tube.
Figure 8:
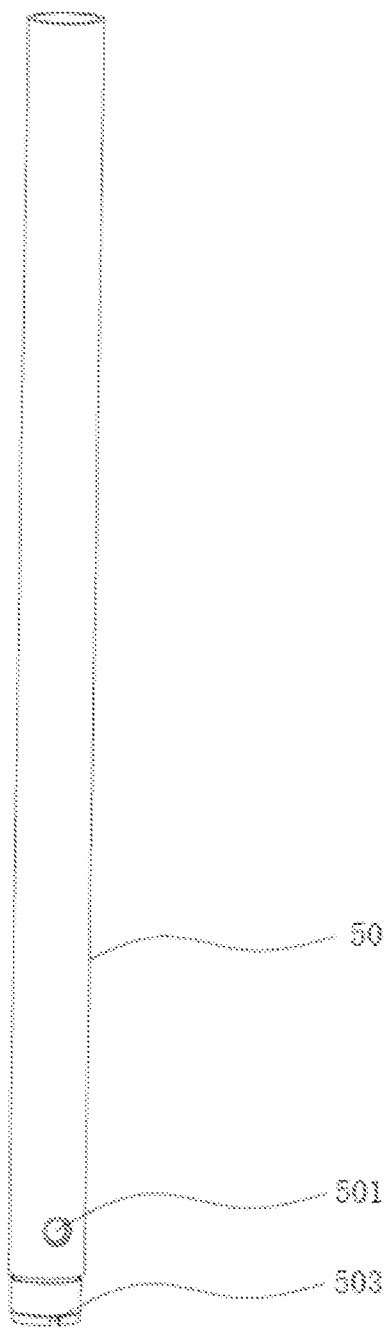
FIG. 8 is a structure diagram of the control tube configured for mounting the control assembly.

As shown in FIG. 1 and FIG. 2 and FIG. 5, in one specific embodiment, the light source 4 includes a lamp panel 41, and a lamp strip 42, a reflector 43, a light guide plate 44 and a diffuser 45 which are all mounted on the lamp panel 41. The lamp panel 41 is defined with a lamp slot 46, the lamp strip 42, the reflector 43, the light guide plate 44 and the diffuser 45 are sequentially mounted in the lamp slot 46. An upper surface and a side surface of the lamp panel 41 are opaque. A lower surface of the lamp panel 41 is defined with the lamp slot 46 which is circular. The lamp strip 42 is ring-shaped. The reflector 43, the light guide plate 44 and the diffuser 45 are all disc-shaped. The center of a bottom of the lamp panel 41 is provided with a connecting portion 49. The connecting portion 49 is threadedly connected to the fixing seat 37, so that the lamp panel 41 is mounted on the steering tube 36 through the fixing seat 37. A bottom of the lamp slot 46 is also defined with a wiring groove 47 communicated with the threaded hole of the connecting portion 49. The wiring groove 47 extends from the center of the bottom of the lamp slot 46 to an edge of the lamp slot 46. The light strip 42 is looped on a circumferential side of the lamp slot 46. The reflector 43, the light guide plate 44, and the diffuser 45 are received in the lamp slot 46 in sequence. The light of the lamp strip 42 is reflected by the reflector 43, passed through the light guide plate 44 and the diffuser 45, and finally irradiated from a lower end of the lamp panel 41.

Specifically, in an embodiment, the light illumination direction of the light source may be downward or upward.

In one specific embodiment, the bottom of the lamp slot 46 is also provided with a square slot 48 for attaching an EVA block. The EVA block has a certain degree of elasticity and can resist against the reflector 43 and the light guide plate 44 to avoid a gap among the lamp strip 42, the reflector 43, the light guide plate 44 and the diffuser 45 when the lamp strip 42, the reflector 43, the light guide plate 44 and the diffuser 45 are mounted in the lamp slot 46.

In one specific embodiment, the centers of the reflector 43, the light guide plate 44, and the diffuser 45 are all provided with through holes for a cable 541 to pass through. The cable 541 passes through the diffuser 45, the light guide plate 44, the reflector 43, and the wiring groove 47 in the center of the lamp panel 41, and connects with the lamp strip 42 on the circumferential side of the lamp panel 41, so as to transmit electricity to the lamp strip 42.

As shown in FIG. 1 and FIGS. 6 to 8, in one specific embodiment, the height adjustable controller 2 includes a control assembly 5. The control assembly 5 includes a control tube 50, a bracket 51 mounted in the control tube 50, a control circuit board 52 and a socket 53 both mounted on the bracket 51, and a control panel 54 connected to the control circuit board 52. A lower end of the control tube 50 is connected to the base 1, and an upper end of the control tube 50 is connected to the ball and socket joint 3.

In one specific embodiment, the height adjustable controller 2 further includes a plurality of connecting pipes 21 connected in the vertical direction. The control tube 50 is arranged in the vertical direction and connected with at least one connecting pipe 21, to form a straight pipe. The control tube 50 can be threadedly connected with any two adjacent connecting pipes 21. The connecting pipes 21 may have the same length or different lengths. An appropriate number of connecting pipes 21 with different lengths may be connected with the control tube 50 in sequence according to needs, to form the height adjustable controllers 2 with different heights. An upper end of the height adjustable controller 2 is connected to the ball and socket joint 3, and a lower end of the height adjustable controller 2 is connected to the base 1, for changing the height of the light source 4.

In one specific embodiment, the bracket 51 is mounted in a tube hole of the control tube 50, and the control tube 50 is defined with a panel hole 502 and a first inserting hole 501 which are both connected to the tube hole of the control tube 50. The control circuit board 52 and the socket 53 are both located in the tube hole of the control tube 50, the control panel 54 is located at the panel hole 502. An input end of the socket 53 is communicated to the first inserting hole 501, and an output end of the socket 53 is electrically connected to the control circuit board 52. The control circuit board 52 is electrically connected to the light source 4, an inner wall of the tube hole of the control tube 50 is defined with a positioning hole 503, and the bracket 51 is provided with a positioning block 511 which is clamped into the positioning hole 503. When the button of the control panel 54 is pressed, the button transmits an electric signal to the control circuit board 52, for controlling the light source 4 through the control circuit board 52. The control circuit board 52 is PCBA. The socket 53 is a DC socket, and the socket 53 is powered by a power adapter. The socket 53 transmits electric energy to the control circuit board 52 through wires and finally transmits the electric energy to the light source 4 through the control circuit board 52 and the cable 541, so that the light source 4 shines. The bracket 51 and the control circuit board 52 of the control assembly 5 are mounted in the control tube 50, and are sealed by the control panel 54 to prevent the control assembly 5 from being damaged. The positioning hole 503 is located at the lower end of the control tube 50, and the positioning block 511 is located at the lower end of the bracket 51. The cooperation of the positioning block 511 and the positioning hole 503 can limit the position of the bracket 51 in the control tube 50 and prevent the bracket 51 from rotating and sliding in the control tube 50. The control tube 50 can be mounted at the upper end or the lower end of different connecting tubes 21, so that the height of the control assembly 5 varies with the height of the control tube 50. The mounting position of the control tube 50 can be adjusted according to actual needs.

In one specific embodiment, the mounting process of the control tube 50 includes: threadedly mounting the control tube 50 on the upper end of the uppermost connecting tube 21, mounting the ball and socket joint 3 on the control tube 50, and mounting the lowermost connecting pipe 21 on the base. The support tube 311 is threadedly connected with the control tube 50. The support tube 311 can also be integrally formed with the control tube 50.

In one specific embodiment, the mounting process of the control tube 50 includes: threadedly mounting the control tube 50 on the lower end of the lowermost connecting tube 21, threadedly mounting the lower end of the control tube 50 on the base 1, and mounting the ball and socket joint 3 on the uppermost connecting pipe 21.

In one specific embodiment, the mounting process of the control tube 50 includes: mounting the control tube 50 between any two adjacent connecting tubes 21, and threadedly connecting the upper and lower ends of the control tube 50 to different connecting tubes 21.

In one specific embodiment, the connecting piped 21 are not provided, the mounting process of the control tube 50 includes: threadedly mounting the lower end of the control tube 50 on the base 1, and threadedly mounting the upper end of the control tube 50 on the support tube 311 of the ball and socket joint 3.

In one specific embodiment, the lamp must be provided with the control assembly 5, and the connecting pipe 21 may not be provided, or one or more connecting pipes 21 may be provided. The specific number of the connecting pipes 21 is set according to the required height.

In one specific embodiment, the cable 541 is configured to pass through the control tube 50, the connecting tube 21, the support tube 311, the steering ball 35, the lid 312, and the steering tube 36, and the fixing seat 37 from bottom to top, and finally received in the lamp slot 46. The cable 541 is completely laid in the lamp to improve safety.

Figure 9:
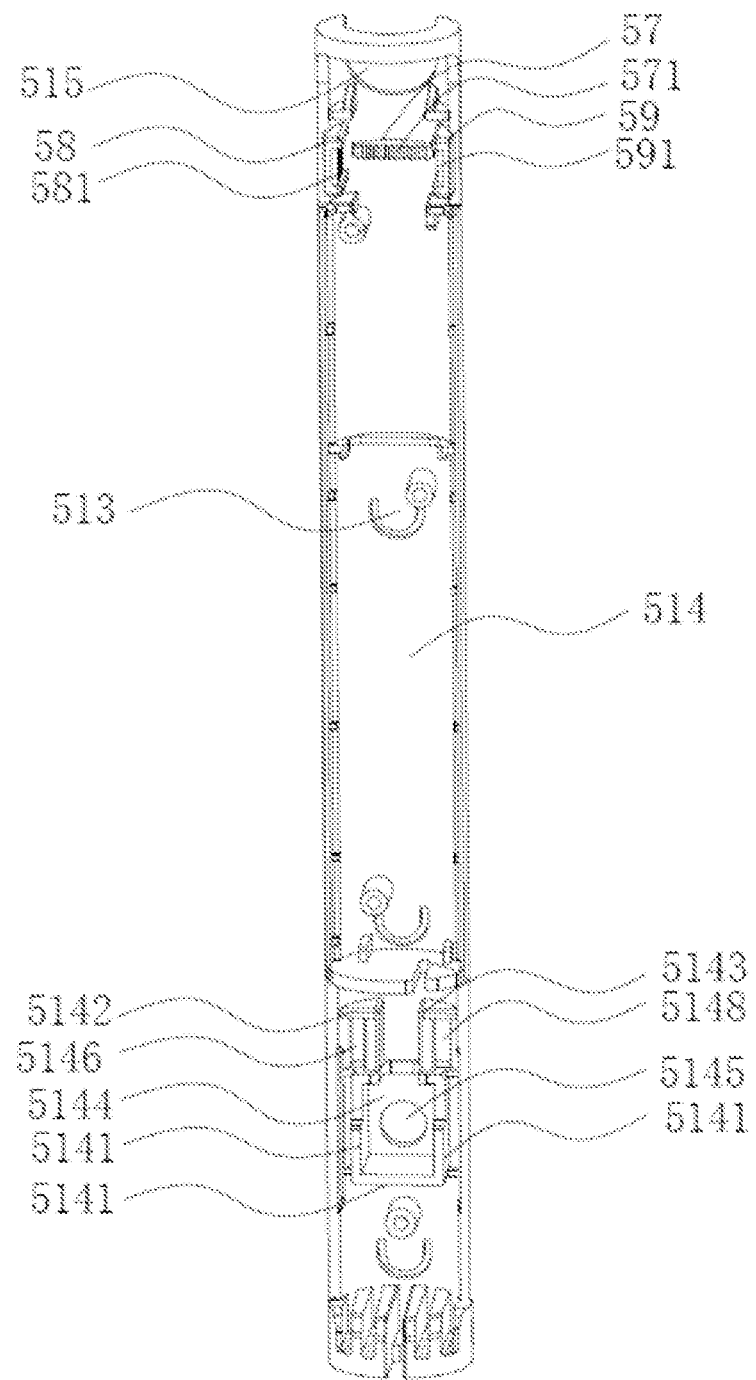
FIG. 9 is a front view of the bracket.
Figure 10:
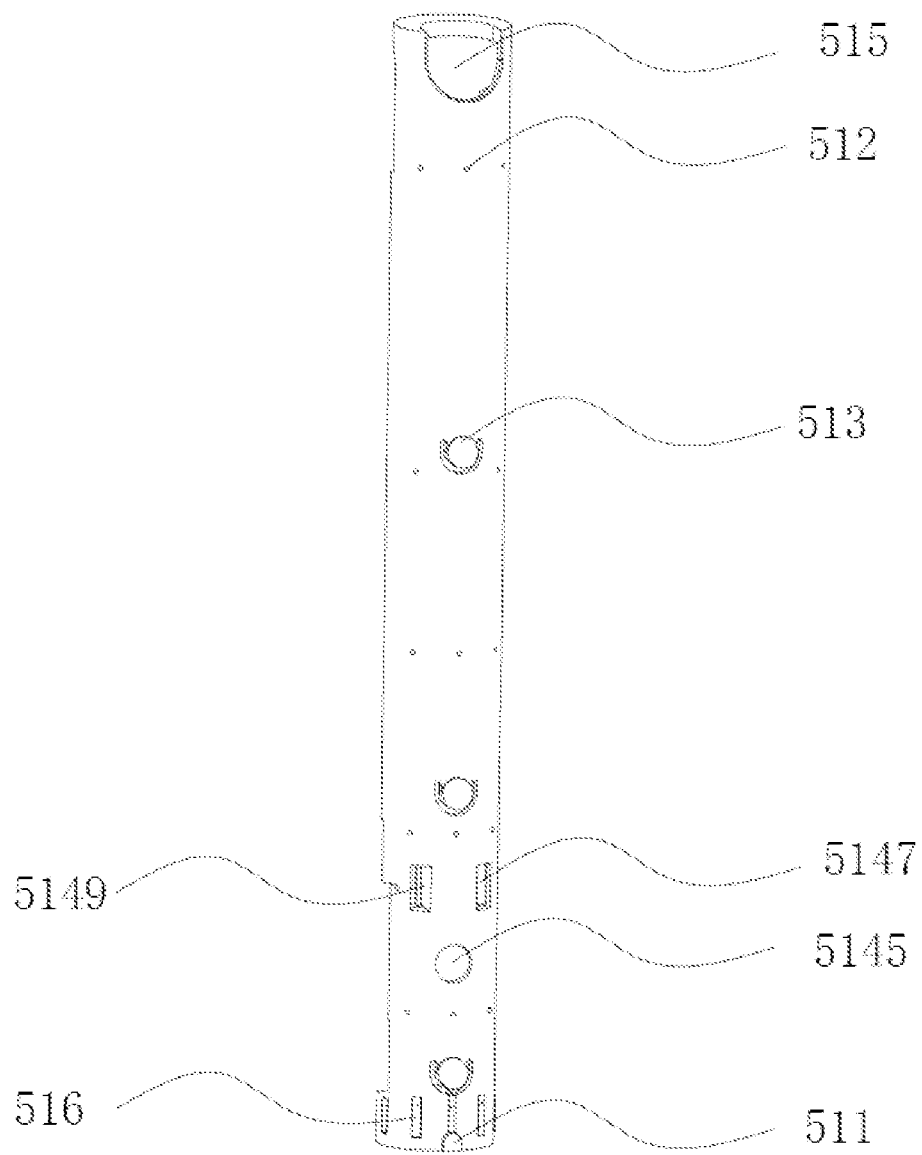
FIG. 10 is a back view of the bracket.
Figure 11:
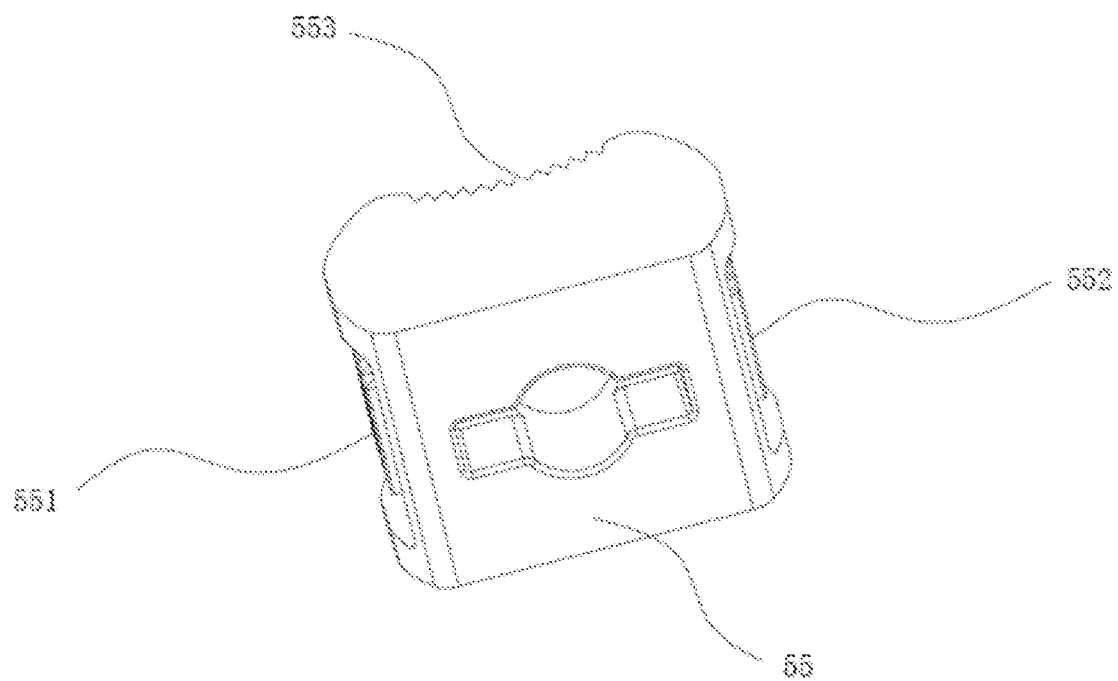
FIG. 11 is a structure diagram of the wire buckle.
Figure 12:
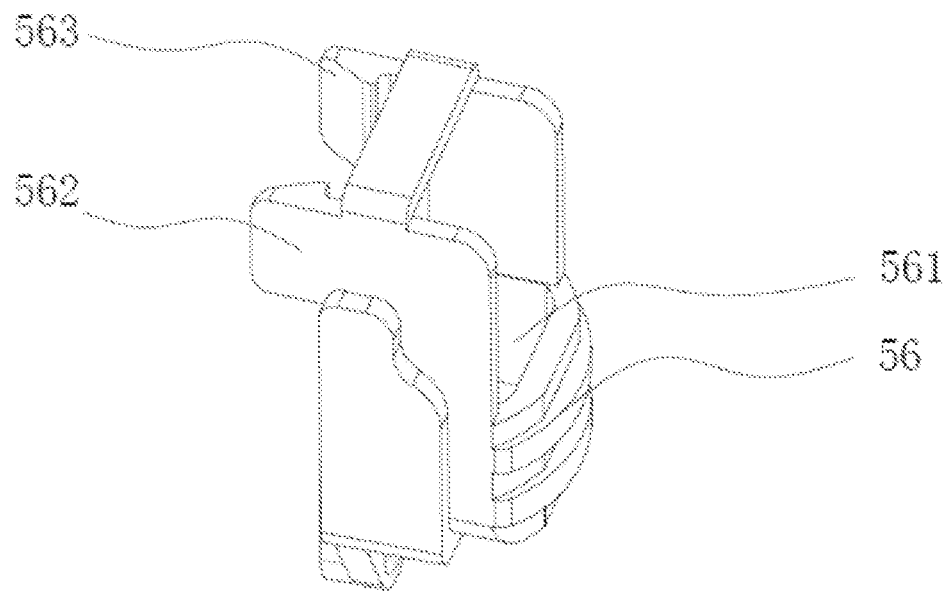
FIG. 12 is a structure diagram of the pressing buckle.

As shown in FIGS. 9 to 10, in one specific embodiment, the bracket 51 is further provided with a bump 512, an elastic piece 513, and a positioning rib 516. The bump 512, the elastic piece 513, and the positioning rib 516 are all abutted against the inner wall of the tube hole of the control tube 50. The bracket 51 is also provided with a mounting hole. One end of the elastic piece 513 is fixed on an inner wall of the mounting hole, and the other end of the elastic piece 513 is extended in a direction away from the mounting hole. The surface of the elastic piece 513 contacted with the inner wall of the control tube 50 is protruded toward the inner wall of the control tube 50. When the bracket 51 is installed, the elastic piece 513 is pressed into the mounting hole. After the bracket 51 is installed, the elastic piece 513 automatically resets, and is in close contact with the inner wall of the control tube 50 to generate a friction, which further prevents the bracket 51 from sliding and rotating in the control tube 50. The positioning rib 516 is located at the bottom of the bracket 51, which increases the friction between the bracket and the inner wall of the control tube 50. The bracket 51 is mounted in the control tube 50 by the bump 512, the elastic piece 513, and the positioning rib 516. Compared with the traditional installation method of fixing by screws, the mounting of the bracket of the present disclosure does not require screws, which is simpler.

As shown in FIGS. 9 to 12, in one specific embodiment, the bracket 51 is provided with a mounting groove 514 and a wiring hole 515 communicated with the mounting groove 514, and the control circuit board 52 is detachably mounted in the mounting groove 514, a cable 541 is connected to the output end of the control circuit board 52, and the control circuit board 52 is connected to the light source 4 through the cable 541. The wiring hole 515 is located at the upper end of the bracket 51, the upper end of the cable 541 is connected to the controlled light source 4, the lower end of the cable 541 is connected to the control circuit board 52, and the control circuit board 52 is controlled by the control panel 54 to control the lamp. When wiring, the cable 541 is configured to pass through the control tube 50, the connecting pipe 21, the support tube 311, the steering ball 35, the lid 312, the steering pipe 36, and the fixing seat 37 from bottom to top, and finally received in the lamp slot 46. The cable 541 is completely laid on the inner wall of the lamp to improve safety.

In one specific embodiment, the control assembly 5 further includes a wire buckle 55. The inner wall of the mounting groove 514 is also provided with a wire clamping block 57, and a first limiting block 58 and a second limiting block 59 spaced from the first limiting block 58.

The first limiting block 58 is provided with a first buckle tooth groove 581, the second limiting block 59 is provided with a second buckle tooth groove 591, the first buckle tooth groove 581 is opposite to the second buckle tooth groove 591. The wire clamping block 57 is defined with a first wire clamping tooth groove 571, and the wire buckle 55 is defined with a second wire clamping tooth groove 553. An inner wall of the first wire clamping tooth groove 571 and an inner wall of the second wire clamping tooth groove 553 enclose to form a wire clamping groove. The cable 541 is received in the wire clamping groove. The cable 541 is located in a space forming by the first limiting block 58, the second limiting block 59, the inner wall of the mounting groove 514, and the wire buckle 55. The cable 541 is clamped by the inner wall of the first wire clamping tooth groove 571 and the inner wall of the second wire clamping tooth groove 553 to prevent the cable 541 from moving along an axis of the bracket 51 and prevent the cable 541 from being pulled out.

The first limiting block 58 and the second limiting block 59 are horizontally spaced apart from each other. The first clamping teeth 551 and the second clamping teeth 552 are respectively located on the left and right sides of the wire buckle 55, the wire buckle 55 is detachably mounted in the first buckle tooth groove 581 and the second buckle tooth groove 591 through the first clamping tooth 551 and the second clamping tooth 552, respectively. Both the first buckle tooth groove 581 and the second buckle tooth groove 591 have a plurality of grooves arranged in sequence, the first clamping tooth 551 and the second clamping tooth 552 both have a plurality of convex teethes arranged in sequence, and the plurality of convex teethes correspond to the plurality of grooves in a one-to-one manner. The cable 541 can be laid in the mounting groove 514 and placed between the first limiting block 58 and the second limiting block 59, then the wire buckle 55 is fastened to fix the cable 541 in the mounting groove 514, to prevent the cable 541 from moving along the radial direction of the bracket 51.

In one specific embodiment, the control assembly 5 further includes a pressing buckle 56 provided with a seat groove 561, and the socket 53 is mounted in the seat groove 561. The pressing buckle 56 is detachably mounted in the mounting groove 514, the socket 53 is detachably mounted on the pressing buckle 56. The pressing buckle 56 is mounted in the mounting groove 514 of the bracket 51 by a screw, and the socket 53 is mounted on the bracket 51 by the pressing buckle 56. So that, it is easy to disassemble and replace the damaged socket 53. The pressing buckle 56 wraps the socket 53 and can effectively protect the socket 53. The socket 53 is connected to the control circuit board 52 through a socket wire.

In one specific embodiment, at least one fixing plate 5141 is also provided in the mounting groove 514. There are multiple fixing plates 5141 and the multiple fixing plates 5141 enclose to form a buckle groove 5144, and the buckle groove 5144 is in a convex shape. The buckle groove 5144 is defined with a first wire opening through which the socket wire passes. A horizontal plate is arranged on a first enclosure plate 5142 and a second enclosure plate 5143, and the horizontal plate is defined with a second wire opening through which the socket wire passes. The second wire opening and the first wire opening are not on the same vertical line, which can effectively prevent the socket wire from being pulled out.

In one specific embodiment, a first enclosure plate 5142 and a second enclosure plate 5143 are provided in the mounting groove 514. The pressing buckle 56 is mounted in the buckle groove 5144. An inner wall of the buckle groove 5144 is defined with a second inserting hole 5145 connected to the first inserting hole 501. The input end of the socket 53 is located at the second inserting hole 5145. The first enclosure plate 5142 and the second enclosure plate 5143 are located above the fixing plates 5141, and the pressing buckle 56 is inserted in the buckle groove 5144. An input end of the power adapter is passed through the first inserting hole 501 and the second inserting hole 5145 in sequence, and then connected to the socket 53.

The pressing buckle 56 is also provided with a first clamping block 562 and a second clamping block 563. The first enclosure plate 5142 and the mounting groove 514 jointly enclose a first clamping cavity 5146, and an inner wall of the first clamping cavity 5146 is provided with a third clamping tooth 5147. The second enclosure plate 5143 and the mounting groove 514 jointly enclose a second clamping cavity 5148, and an inner wall of the second clamping cavity 5148 is provided with a fourth clamping tooth 5149. The second clamping block 563 is passed through the second clamping cavity 5148 and clamped at the fourth clamping tooth 5149. The pressing buckle 56 is detachably mounted on the bracket 51 through the first clamping block 562 and the second clamping block 563.

In one specific embodiment, the base 1 includes a chassis 11 and a resist column 12, a lower end of the resist column 12 is connected to the chassis 11, and an upper end of the resist column 12 is connected to the height adjustable controller 2.

The mounting process of the present disclosure includes: selecting an appropriate number of connecting pipes 21 according to actual needs, connecting all the connecting pipes 21 with the control assembly 5 to form the height adjustable controller 2, mounting the lowermost connecting pipe 21 on the base 1, mounting the control assembly 5 on the uppermost connecting pipe 21, mounting the ball and socket joint 3 on the control tube 50, mounting the light source 4 on the ball and socket joint 3, and arranging the wire of the control assembly 5 in the control tube 50 completely.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A lamp, comprising a base, a height adjustable controller mounted on the base, a ball and socket joint mounted on the height adjustable controller, and a light source mounted on the ball and socket joint; wherein,
the height adjustable controller is configured to adjust a height of the light source;
the ball and socket joint comprises a seat body, a positioning ring and a spring and a tray all mounted in the seat body, a steering ball, and a steering tube connected to the steering ball; the steering tube is connected to the light source, the seat body is defined with a first through hole and a first opening communicated with the first through hole, the positioning ring is disposed in the first through hole and fixed to an inner wall of the first through hole, and the tray is slidably mounted in the first through hole, the spring is clamped between the positioning ring and the tray, the tray is clamped between the spring and the steering ball, a diameter of the steering ball is greater than a width of the first opening, a part of the steering ball is located in the first through hole, and a spherical center of the steering ball is located in the first through hole, and a remaining part of the steering ball is protruded out the first through hole from the first opening and connected with the steering tube.

2. The lamp according to claim 1, wherein, the seat body comprises a support tube and a lid mounted on the support tube, the first opening is defined at the lid, the positioning ring is mounted in an inside of the support tube, and the lid is connected with the support tube.

3. The lamp according to claim 2, wherein, an inner wall of the first opening comprises a first concave spherical surface attached to a spherical surface of the steering ball, and the tray comprises a second concave spherical surface attached to the spherical surface of the steering ball.

4. The lamp according to claim 1, wherein, the light source comprises a lamp panel, and a lamp strip, a reflector, a light guide plate and a diffuser all mounted on the lamp panel, the lamp panel is defined with a lamp slot, the lamp strip, the reflector, the light guide plate and the diffuser are sequentially mounted in the lamp slot, a center of the lamp panel is provided with a connecting portion, the lamp panel is connected with the steering tube through the connecting portion.

5. The lamp according to claim 1, wherein, the height adjustable controller comprises a control assembly, the control assembly comprises a control tube, a bracket mounted in the control tube, a control circuit board and a socket both mounted on the bracket, and a control panel connected to the control circuit board, one end of the control tube is connected to the base, and another end of the control tube is connected to the ball and socket joint, the bracket is mounted in an inside of the control tube, and the control tube is defined with a panel hole and a first inserting hole both connected to the inside of the control tube, the control circuit board and the socket are both located in the inside of the control tube, the control panel is located at the panel hole, an input end of the socket is communicated to the first inserting hole, and an output end of the socket is electrically connected to the control circuit board, the control circuit board is electrically connected to the light source, an inner wall of the control tube is defined with a positioning hole, and the bracket comprises a positioning block clamped in the positioning hole.

6. The lamp according to claim 5, wherein, the height adjustable controller further comprises at least one connecting pipe connected in a vertical direction in sequence; wherein,
the control tube is arranged in the vertical direction, and connected with the at least one connecting pipe to form a straight pipe.

7. The lamp according to claim 5, wherein, the bracket is further provided with a bump, an elastic piece, and a positioning rib, the bump, the elastic piece, and the positioning rib are all abutted against the inner wall of the control tube; and the bracket is further defined with a mounting groove and a wiring hole communicated with the mounting groove, the control circuit board is detachably mounted in the mounting groove, the output end of the control circuit board is connected to a cable, and the control circuit board is connected to the light source through the cable.

8. The lamp according to claim 7, wherein, the control assembly further comprises a wire buckle and a pressing buckle, an inner wall of the mounting groove is also provided with a wire clamping block, a first limiting block and a second limiting block spaced from the first limiting block;
the first limiting block is defined with a first buckle tooth groove, the second limiting block is defined with a second buckle tooth groove disposed opposite to the first buckle tooth groove, the wire buckle is provided with a first clamping tooth matched with the first buckle tooth groove and a second clamping tooth matched with the second buckle tooth groove, the wire clamping block is defined with a first wire clamping tooth groove, and the wire buckle is defined with a second wire clamping tooth groove, an inner wall of the first wire clamping tooth groove and an inner wall of the second wire clamping tooth groove enclose to form a wire clamping groove, and the cable is received in the wire clamping groove;

the pressing buckle is defined with a seat groove;

a fixing plate, a first enclosure plate, and a second enclosure plate are received in the mounting groove;

there are a plurality of fixing plates and the plurality of fixing plates are enclosed to form a buckle groove, the pressing buckle is mounted in the buckle groove, the socket is mounted in a space enclosed by an inner wall of the seat groove and an inner wall of the buckle groove, the inner wall of the buckle groove is defined with a second inserting hole communicated with the first inserting hole, the input end of the socket is received in the second inserting hole; and the pressing buckle is also provided with a first clamping block and a second clamping block, the first enclosure plate and the mounting groove are jointly enclosed to form a first clamping cavity, an inner wall of the first clamping cavity is provided with a third clamping tooth, the first clamping block is passed through the first clamping cavity and the third clamping tooth, the second enclosure plate and the mounting groove are jointly enclosed to form a second clamping cavity, and an inner wall of the second clamping cavity is provided with a fourth clamping tooth, the second clamping block is passed through the second clamping cavity and the fourth clamping tooth.

9. The lamp according to claim 1, wherein, the diameter of the steering ball is greater than or equal to 1.35 times a diameter of the steering tube.

10. The lamp according to claim 1, wherein, a diameter of an outer wall of the first opening is greater than or equal to 0.885 times the diameter of the steering ball, and smaller than the diameter of the steering ball.

11. The lamp according to claim 1, wherein, the base comprises a chassis and a resist column, a lower end of the resist column is connected to the chassis, and an upper end of the resist column is connected to the height adjustable controller.

* * * * *